(12) United States Patent
Rubens et al.

(10) Patent No.: US 10,011,036 B2
(45) Date of Patent: Jul. 3, 2018

(54) BLADE AND BLADE ATTACHMENT SYSTEM FOR AN OSCILLATING TOOL

(71) Applicants: Robert Bosch Tool Corporation, Broadview (IL); Robert Bosch GmbH, Stuttgart (DE)

(72) Inventors: Jeremy Rubens, Palatine, IL (US); Brad Padget, Huntley, IL (US); Brian Haman, Chicago, IL (US); Jaime Moreno, Imperial, CA (US); Chris Dvorak, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 241 days.

(21) Appl. No.: 14/935,924

(22) Filed: Nov. 9, 2015

(65) Prior Publication Data
US 2017/0129125 A1    May 11, 2017

(51) Int. Cl.
*B27B 19/00*    (2006.01)
*B26B 7/00*    (2006.01)

(52) U.S. Cl.
CPC ............. *B27B 19/006* (2013.01); *B26B 7/00* (2013.01)

(58) Field of Classification Search
CPC ..... B27B 19/00; B27B 19/002; B27B 19/004; B27B 19/006; B27B 19/008
USPC .................................................... 30/392–394
See application file for complete search history.

(56) References Cited

U.S. PATENT DOCUMENTS

| | | | | |
|---|---|---|---|---|
| 3,440,915 A | * | 4/1969 | Weyant | B23D 35/00 83/481 |
| 3,943,934 A | * | 3/1976 | Bent | B27B 5/32 30/339 |
| 4,386,609 A | * | 6/1983 | Mongeon | B23D 51/10 30/339 |
| 4,657,428 A | * | 4/1987 | Wiley | B24B 45/006 30/388 |
| 5,038,478 A | * | 8/1991 | Mezger | B26B 7/00 30/169 |
| 5,263,283 A | * | 11/1993 | Rudolf | B25F 3/00 451/342 |
| 5,366,312 A | * | 11/1994 | Raines | B24B 45/00 30/340 |
| 5,423,825 A | * | 6/1995 | Levine | A61B 17/1604 29/275 |
| 5,456,011 A | * | 10/1995 | Inkster | B23D 61/006 30/293 |

(Continued)

*Primary Examiner* — Jason Daniel Prone
*Assistant Examiner* — Richard Crosby, Jr.
(74) *Attorney, Agent, or Firm* — Maginot Moore & Beck LLP (57) ABSTRACT

A blade attachment system includes a tool mount, a blade holder plate attached to the tool mount adapter; and a clamping assembly attached to the blade holder plate. The clamping assembly includes a plurality of fixed clamping positioned adjacent to at least one of the lateral edges of the blade when the blade is placed on the blade holder plate and including tapered surfaces configured to overlap the lateral edges of the blade and at least one movable clamping pin that is movably mounted to the blade holder plate, the movable clamping pin being configured to move with respect to the blade to move the lateral edges of the blade into engagement with the tapered surfaces of the clamping pins.

2 Claims, 12 Drawing Sheets

(56) References Cited

U.S. PATENT DOCUMENTS

| | | | | |
|---|---|---|---|---|
| 5,658,304 | A * | 8/1997 | Lim | A61B 17/1637 30/351 |
| 5,718,621 | A * | 2/1998 | Turley | B24B 23/028 451/342 |
| 5,735,866 | A * | 4/1998 | Adams | B23D 61/006 30/339 |
| 5,743,140 | A * | 4/1998 | Gustafson | F02N 15/00 248/200 |
| 5,839,196 | A * | 11/1998 | Trott | B23D 51/10 30/339 |
| 6,569,001 | B2 * | 5/2003 | Rudolf | B24B 23/02 451/344 |
| 7,189,239 | B2 * | 3/2007 | Fisher | B23D 51/10 606/176 |
| 7,217,177 | B2 * | 5/2007 | Frech | B24B 23/04 451/357 |
| 7,833,241 | B2 * | 11/2010 | Gant | A61B 17/1637 30/339 |
| 8,151,679 | B2 * | 4/2012 | Bohne | B24B 23/04 83/698.11 |
| 8,317,574 | B2 * | 11/2012 | Blickle | B24B 23/02 294/94 |
| 8,365,419 | B2 * | 2/2013 | Bernardi | B25F 5/00 30/371 |
| 8,925,931 | B2 * | 1/2015 | Sergyeyenko | B24B 23/04 279/141 |
| 9,061,410 | B2 * | 6/2015 | Zhou | B25F 5/00 |
| 9,067,293 | B2 * | 6/2015 | Bernardi | B24B 23/022 |
| 9,174,354 | B2 * | 11/2015 | Zhou | B27B 5/32 |
| 9,186,770 | B2 * | 11/2015 | Montplaisir | B24B 23/04 |
| 9,486,909 | B2 * | 11/2016 | Zieger | B24B 23/022 |
| 9,486,934 | B2 * | 11/2016 | Zhou | B23Q 3/14 |
| 9,539,682 | B2 * | 1/2017 | Kawakami | B23Q 3/14 |
| 9,555,554 | B2 * | 1/2017 | Thorson | B23B 31/4073 |
| 9,669,536 | B2 * | 6/2017 | Ito | B25F 5/02 |
| 9,694,472 | B2 * | 7/2017 | Luescher | B24B 45/006 |
| 9,751,203 | B2 * | 9/2017 | Wierzchon | B25F 3/00 |
| 2009/0312761 | A1 * | 12/2009 | Boykin | B27B 5/32 606/82 |
| 2009/0312762 | A1 * | 12/2009 | Boykin | A61C 3/12 606/82 |
| 2010/0056029 | A1 * | 3/2010 | Grunikiewicz | B23B 31/008 451/442 |
| 2011/0000690 | A1 * | 1/2011 | Kildevaeld | B23D 51/10 173/29 |
| 2011/0067894 | A1 * | 3/2011 | Bernardi | B25F 5/00 173/1 |
| 2011/0266759 | A1 * | 11/2011 | Goldman | B24B 23/04 279/106 |
| 2011/0316241 | A1 * | 12/2011 | Zhang | B23D 61/006 279/143 |
| 2012/0074657 | A1 * | 3/2012 | Zhou | B23B 31/4073 279/128 |
| 2012/0169018 | A1 * | 7/2012 | Lu | B25F 3/00 279/143 |
| 2013/0180747 | A1 * | 7/2013 | Brown | B25F 5/00 173/145 |
| 2013/0193655 | A1 * | 8/2013 | Kaye, Jr. | B27B 19/006 279/141 |
| 2014/0182873 | A1 * | 7/2014 | Fankhauser | B24B 45/00 173/213 |
| 2014/0299345 | A1 * | 10/2014 | McRoberts | B24B 23/043 173/162.2 |
| 2017/0050292 | A1 * | 2/2017 | Aoki | B23D 51/10 |
| 2017/0129125 | A1 * | 5/2017 | Rubens | B27B 19/006 |
| 2017/0129126 | A1 * | 5/2017 | Rubens | B27B 19/006 |

* cited by examiner

BLADE AND BLADE ATTACHMENT SYSTEM FOR AN OSCILLATING TOOL

TECHNICAL FIELD

The disclosure relates generally to oscillating power tools, and more particularly to blades and blade attachment systems for oscillating power tools.

BACKGROUND

In general, oscillating tools are light-weight, handheld power tools capable of being equipped with a variety of tool accessories and attachments, such as cutting blades, sanding discs, grinding tools, and many others. These types of tools, referred to hereinafter as power tools, typically include a generally cylindrically-shaped main body that serves as an enclosure for an electric motor as well as a hand grip for the tool. The electric motor is operably coupled to a drive member, referred to herein as a tool holder, that extends from a portion of the main body of the power tool. The electric motor is configured to rotate and/or oscillate the tool holder at relatively high frequencies.

Figure 3:
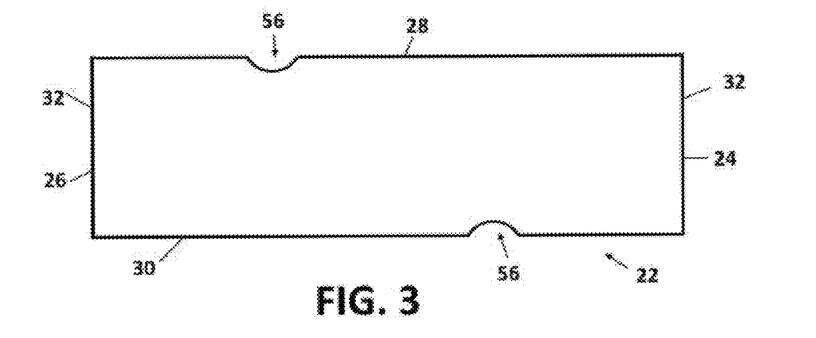
FIG. 3 is a perspective view of first embodiment of a blade attachment system attached to a tool holder of an oscillating tool, such as the tool holder of FIG. 2.

The tool holder in turn is configured to secure different accessory tools so that as the tool holder is driven to move by the electric motor, an accessory tool secured to the holder is driven to perform work on a work piece. Referring to FIG. 3, accessory tools 2 for oscillating power typically have a mounting portion 3 and a work portion 4. The mounting portion 3 is configured to interface with the tool holder in a manner that enables the accessory tool to be oscillated with the tool holder. The work portion 4 extends from the mounting portion and is configured to perform some kind of function as the accessory tool is oscillated. For example, blade accessory tools typically have a cutting edge 5 for performing cuts as the tool is oscillated.

The work portion of accessory tools, such as a cutting edge, will inevitably become worn with use. The work portion can also be damaged through inadvertent contact with an object such as a nail during a cutting operation. The work portion is only a small part of the overall structure of the accessory tool, but, when the work portion becomes worn or damaged, the entire accessory tool is no longer useful. What is needed is a blade configuration that does not require extra material, fabrication, and processing to incorporate a mounting interface onto the tool so that the blade could be manufactured at lower cost, and a blade attachment system that enables such blades to be used with the standard tool interface.

DETAILED DESCRIPTION

For the purposes of promoting an understanding of the principles of the invention, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one of ordinary skill in the art to which this disclosure pertains.

The disclosure is directed to a blade configuration and blade attachment system for an oscillating power tool in which the blade construction is simplified by eliminating the mounting interface. This allows blades to be provided with cutting edges on each end which can be of the same type or different for different applications. The blade attachment system is configured to releasably secure the blade to the tool holder and provide a quick change capability that is not possible with prior art blade and blade attachment systems. In addition, the blade attachment system enables different configurations of blades to be used. For example, in one embodiment, the leading edge and the trailing edge of the blade each comprise a cutting edge. The blade attachment system is configured to retain the blade with either the leading edge or the trailing edge facing forwardly.

Figure 1:
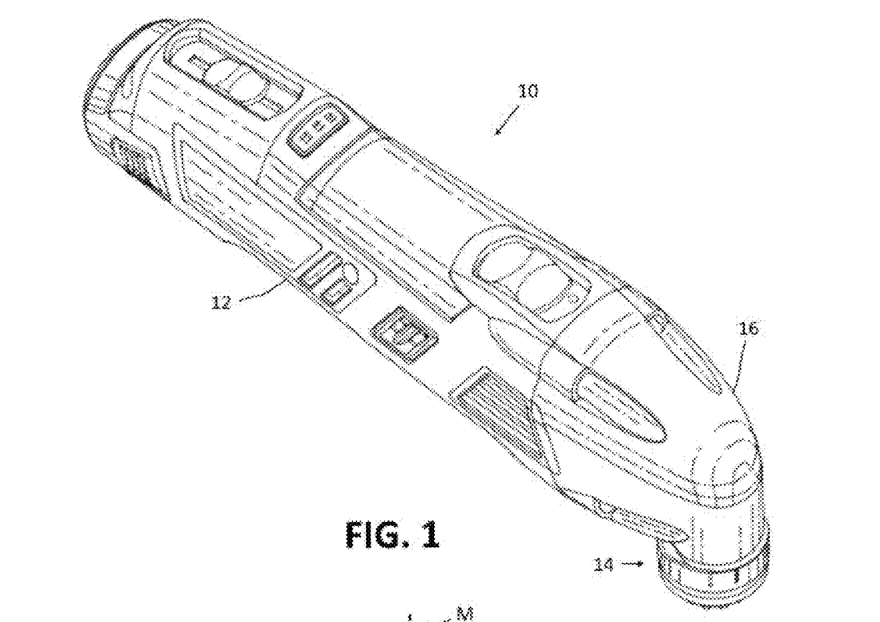
FIG. 1 is a perspective view of an oscillating tool.
Figure 2:
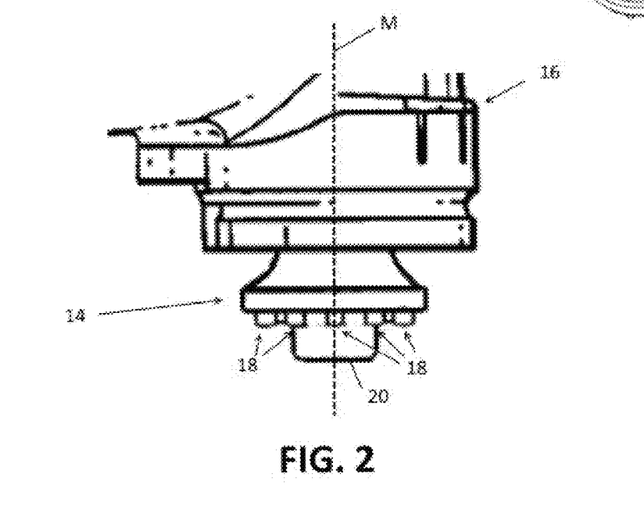
FIG. 2 is a side view of the tool holder of the oscillating tool of FIG. 1.

As depicted in FIGS. 1 and 2, an oscillating power tool 10 includes a housing 12 that serves as a hand grip for the tool 10 and an enclosure for retaining an electric motor (not shown). The electric motor oscillates a tool holder 14 extending from a nose portion 16 of the housing to which various accessory tools may be attached. As the tool holder 14 is oscillated, an accessory tool secured to the tool holder is driven to perform a particular function, such as cutting, depending on the configuration of the type of accessory tool. Power for the electric motor is received from a suitable power source (not shown), such as an internal batter supply, a power cord connected to an AC wall outlet, a USB connected to an external source such as an electronic device, AC wall outlet, or in a vehicle, a wireless charging such as an inductive charging or Qi charging.

Referring to FIG. 2, the motor is configured to oscillate the tool holder 14 about an axis M at high frequencies, e.g., 5,000 to 25,000 oscillations per minute, with a small oscillating angle, typically in a range of between 0.5° and 7°. To enable a secure connection between the tool holder 14 of the power tool 10 and accessory tools for use with the power tool, the tool holder 14 is provided with a tool drive structure. The drive structure includes topographical features, such as protrusions, openings, recesses, and the like, that are arranged in a particular pattern and have predetermined sizes and shapes. In the embodiment of FIG. 2, the tool holder 14 includes a tool drive interface that comprises a plurality of protrusions 18 arranged in a circular pattern about a central bore (not shown).

Tool holder 14 includes a fastening structure 20 that is configured to retain an accessory tool on the tool holder 14. In the embodiment of FIG. 2, the fastening structure 20 comprises a clamping screw that is configured to be threaded into the central bore of the tool holder 14. The head of the clamping screw is configured to press the accessory tool against the tool holder 14 to retain the accessory tool on the tool holder. In alternative embodiments, any suitable type of fastening structure for the tool holder 14 may be used.

Accessory tools, such as blades, for use with the tool holder typically have a tool attachment interface that is configured to interlock with the tool drive interface of the tool holder. The blade attachment systems described enables blades that do not have the tool drive interface to be secured to the tool holder. An example of a blade that can be secured to the tool holder by the blade attachment system is depicted in FIG. 3. The blade 22 comprises a planar, rectangular-shaped body formed of a hard metal material, such as carbon steel. Other materials suitable for making a blade in order to cut a target such as wood, plastic, concrete, or the like are possible. The blade has a first end portion 24, a second end portion 26, and a pair of lateral edge portions 28, 30. At least one of the end portions comprises a cutting edge. The blade 22 is not provided with an oscillating interface for mounting the blade to the oscillating tool as is typically used in previously known blade accessory tools. Therefore, the extra material, fabrication, and assembly required to manufacture blades with integral mounting features is not needed so the cost of manufacturing the blade can be significantly reduced.

Another benefit of not requiring an oscillating interface is that the second end of the blade can now be used as an additional cutting edge. For example, as depicted in FIG. 3, the first and the second end portions 24, 26 of the blade each include a cutting edge 32. The cutting edges 32 may comprise serrated cutting edges having a plurality of cutting teeth. The cutting teeth may be formed in any suitable manner including grinding or laser cutting. The geometry of the cutting teeth can be varied from blade to blade to facilitate the cutting of different kinds of materials, such as wood and metal. The cutting edges 32 on each end of the blade may have the same configuration or different configurations to facilitate use with different kinds of material.

The blade 22 may be formed from a single piece of sheet metal. Alternatively, the blade may be formed by two separate pieces of sheet metal that are fixed together, e.g., by spot welding, ultrasonic welding, or the like. This may simplify that manufacturing process as blades with different cutting edges can be manufactured separately and then assembled with different combinations of cutting edge types. This also allows different materials to be used for different blade portions and cutting edge types to further facilitate use in different applications.

Figure 4:
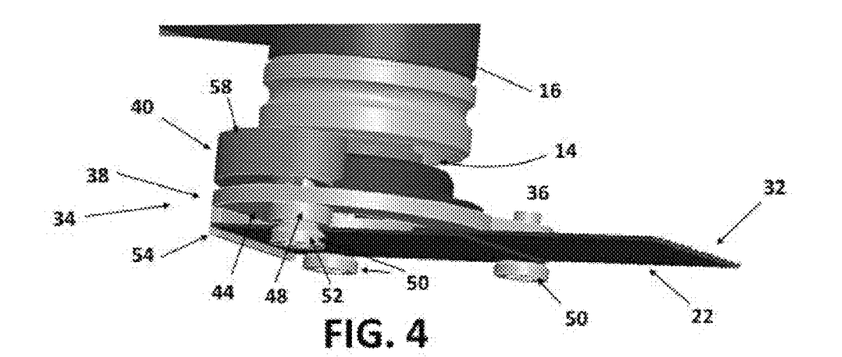
FIG. 4 is perspective view of the blade attachment system of FIG. 3 shown removed from the tool.
Figure 5:
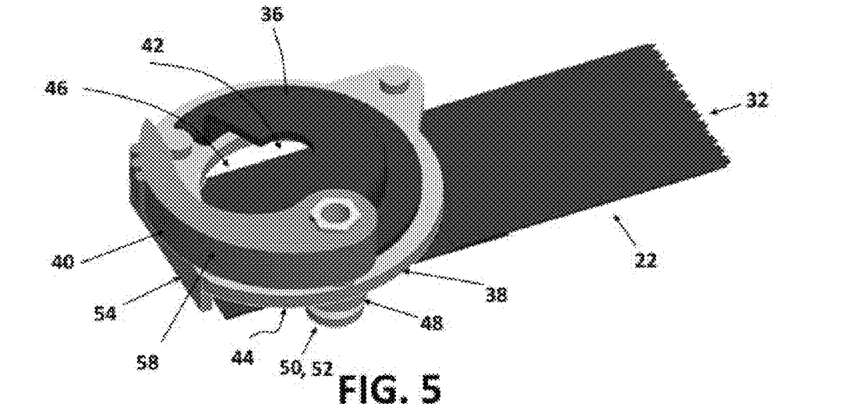
FIG. 5 depicts the blade of FIGS. 3 and 4 removed from the blade attachment system.

Referring to FIGS. 4 and 5, a blade attachment system 34 is configured to enable the blade 22 to be releasably and securely attached to the tool holder 14 of the oscillating tool 10 as depicted in FIG. 1. The blade attachment system 34 includes a tool mount adapter 36, a blade holder plate 38, and a blade clamping assembly 40. The tool mount portion 36 is configured to releasably secure the blade attachment system 34 to the tool holder 14 of the oscillating tool in a manner that enables the blade attachment system 34 to be oscillated by the tool holder 14.

The tool mount adapter 36 is formed of a metal material, such as carbon steel, having a generally flat shape and may include mounting features and drive interfaces are typically integrated into the accessory tools of the prior art. The drive attachment interface, such as depicted in FIGS. 11, 13, 17 and 19, is configured complementarily with respect to the drive structure and fastening mechanisms on the tool holder 14 of the oscillating power tool 10. In addition, the tool mount adapter 36 defines a central opening 42 through which the clamping screw passes prior to being engaged with a bore of the tool holder 16. To install the blade attachment system onto the tool holder, the tool mount adapter 36 is held against the tool holder 14 with the drive interfaces interlocked. The clamping screw 20 is then tightened until the head of the clamping screw 20 presses the tool mount adapter 36 against the tool holder 14 as depicted in FIG. 4.

The blade holder plate 38 is secured to the tool mount adapter 36 and provides a support structure for blade clamping assembly 40 and the blade 22. The blade holder plate 38 is formed of metal or some other type of suitably rigid and strong material including certain plastic and composite materials. The blade holder plate may be secured to the tool mount in any suitable manner, such as by welding. In other embodiments, the blade holder plate 38 and the tool mount adapter 36 may be integrally formed, e.g., by injection molding (See, e.g., FIG. 17). The blade holder plate includes a lower surface 44 that faces away from the tool holder 14 and that provides a location for attaching blade 22. The blade holder plate 38 is positioned with respect to the tool mount adapter 36 such that, when the tool mount adapter 36 is installed on the tool holder 16, the blade holder plate 38 is offset below the tool mount adapter 36. An opening 46 is defined in the central region of the blade holder plate 38 for accessing the tool mount adapter 36.

The blade clamping assembly 40 is mounted to the lower side of blade holder plate 38. The blade clamping assembly 40 is configured to releasably secure the blade 22 to the blade holder plate 38 so the blade 22 can be oscillated along with the blade holder plate and tool mount adapter by the tool holder 14 and with the blade 22 held in an appropriate position with respect to the oscillating tool 10 to perform its intended function. A minimal amount of material of the blade mount portion 38 should extend below the blade 22 so as not to interfere with the operation of the blade.

The blade clamping assembly 40 may be provided in a variety of configurations, as discussed below. The blade clamping assembly is configured to apply a clamping force both vertically and laterally. The vertical clamping force holds the blade 22 against the lower surface 44 of the blade holder plate 38, or in some cases, the lower surfaces of spacer structures 48 and works to prevent movement of the blade 22 in directions orthogonal to the lower surface 44 of the blade holder plate 38. The lateral clamping force is applied laterally to one or more sides of the blade and works to prevent movement of the blade in directions that are generally parallel to the lower surface of the blade holder plate and the plane of the blade. The mechanisms used to generate the vertical and lateral clamping forces can vary depending on the configuration of the clamping assembly.

Figure 6:
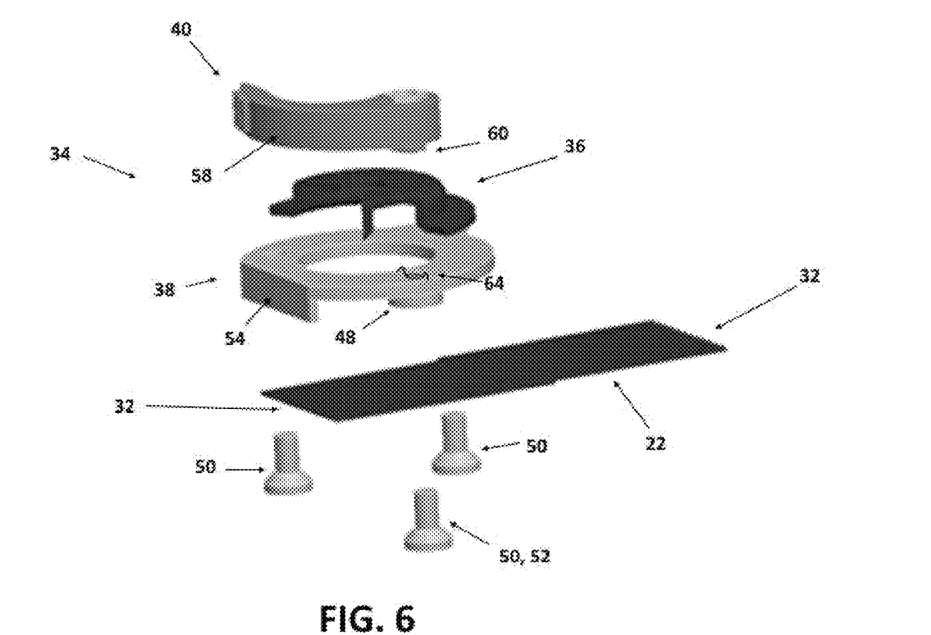
FIG. 6 is an exploded view of the blade attachment system of FIG. 4.
Figure 7:
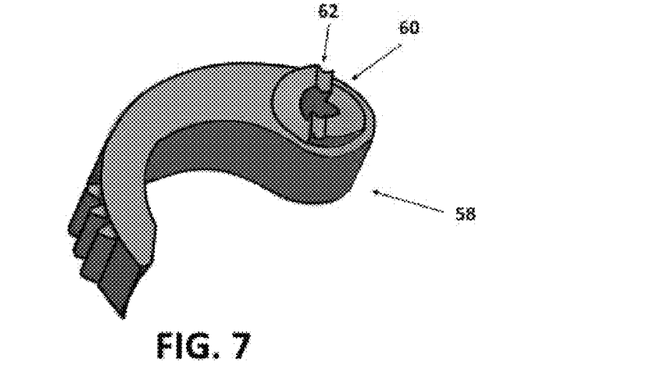
FIG. 7 is a perspective view of the lever arm of the blade attachment system.

The blade clamping assembly 40 comprises a plurality of clamping pins 50 that extend downwardly from the lower surface 44 of the blade holder plate 38 at positions where the pins 50 can engage the lateral edges of the blade. At least one pin 50 is positioned to engage each lateral side of the blade. In the embodiment of FIGS. 4-6, three pins 50 are used to bracket the blade 22 with two pins being positioned to engage one lateral edge of the blade and one pin being positioned to engage the opposite lateral edge. In alternative embodiments, two or more pins may be used to hold each side of the blade.

As can be seen in FIG. 4, each of the pins 50 comprises a wider head portion and a narrow base portion. The base portions of the pins are positioned just outside of the locations where the edges of the blade are desired to be placed when secured to the blade holder plate. The head portions of the pins are wide enough to overlap the edge of a blade of the appropriate size when the blade is placed between the pins. The pins 50 are tapered inwardly from the head portion to the base portion so that lateral movement of the blade edge toward the tapered surface of the pin results in a vertical movement of the blade toward the lower surface of the plate. In this manner, the pins 50 may be used to create both a lateral and a vertical clamping load for securing the blade to the blade holder plate. The head portion may be tapered around the entire circumference of the pin. Alternatively, the tapered portion may be provided only on the portion of the pin arranged facing the edge of the blade.

The clamping load may be generated by moving the blade 22 with respect to the pins 50, moving one or more of the pins 50 with respect to the blade 22, and/or by moving both the blade 22 and one or more of the pins 50 with respect to each other. In the embodiment of FIGS. 3-6, the clamping force is generated by moving one of the clamping pins 50 with respect to the blade 22. More specifically, the clamping pin positioned to engage one lateral edge of the blade is configured as a movable clamping pin 52 while the clamping pins 50 used to engage the opposite lateral edge of the blade comprise fixed pins.

The movable clamping pin 52 is configured to move in a manner that results in the tapered surface of the pin 50 moving into engagement with a lateral edge 28, 30 of the blade. As the tapered surface pushes against the lateral edge of the blade, the blade 22 is moved both vertically toward the lower surface of the plate and laterally toward the opposing clamping pins. The lateral movement of the blade toward the opposing clamping pins results in a similar action at each of the pins. Thus, the movement of the movable clamping pin 52 with respect to the lateral edge of the blade 22 results in a vertical clamping force and a lateral clamping force being applied to each side of the blade. The blade holder plate 38 may include a rear wall 54 that extends downwardly at a position behind the trailing edge of the blade 22 in order to prevent rearward movement of the blade during use. The blade 22 may also be provided with cutouts 56, such as depicted in FIG. 3, that are configured to be engaged by the clamping pins 50. The cutouts 56 provide edges that are transverse to the forward and rearward direction that can be engaged by the pins 50 to prevent movement of the blade forwardly and/or rearwardly with respect to the blade holder.

The movable clamping pin 52 may be rotatably attached to the blade holder plate 38. To this end, the blade holder plate 38 includes a pin receiving opening through which the stem of the movable clamping pin 52 is extended. A lever arm 58 is attached to the stem on the upper side of the blade holder plate 38. The axis of rotation is centered on the stem of the pin 52. The lever arm 58 is configured to rotate the pin 52 about the pin axis between a clamped and an unclamped position. Movement of the tapered surface of the clamping pin 52 with respect to the blade edge is implemented by a cam structure 60. In the embodiment of FIGS. 3-6, the cam structure 60 comprises a face cam arranged between the facing surfaces of the lever arm 58 and the blade holder plate 38. The face cam comprises a ramp-like structure on the lever arm that causes an axial movement of the lever arm toward and away from the upper surface of the plate as the lever arm is rotated.

The cam structure 60 is configured to cause the lever arm 58 to move axially away from the upper surface of the plate as the lever arm rotates from the unclamped toward the clamped position. The stem of the pin 52 is non-rotatably secured to the lever arm 58 so that movement of the upward movement of the lever arm 58 pulls the clamping pin 52 axially toward the lower surface 44 of the blade holder plate 38. This movement brings the tapered surface of the pin 52 into engagement with the edge of the blade 22 and thereby generates the vertical and lateral clamping forces. Complementary detent structures 62, 64 are provided on the lever arm 58 and blade holder plate 38, respectively, that can interact to releasably retain the lever arm in the clamped position.

Figure 8:
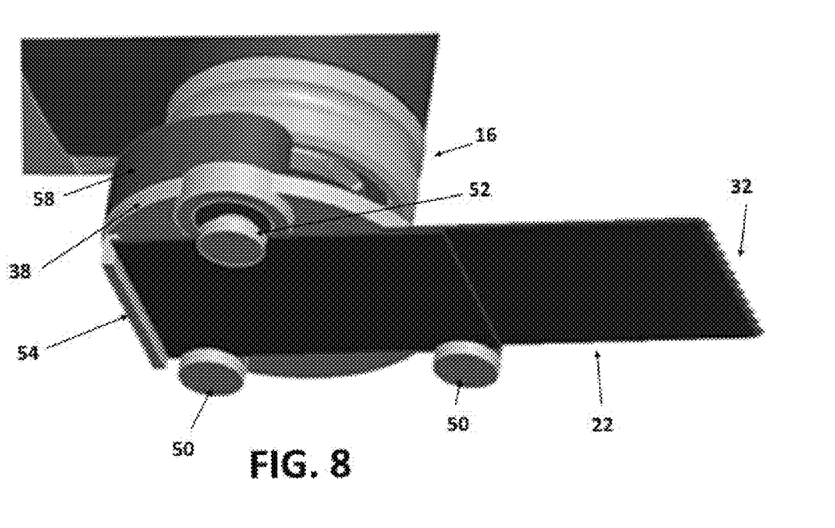
FIG. 8 depicts another embodiment of a blade attachment system for an oscillating tool.
Figure 9:
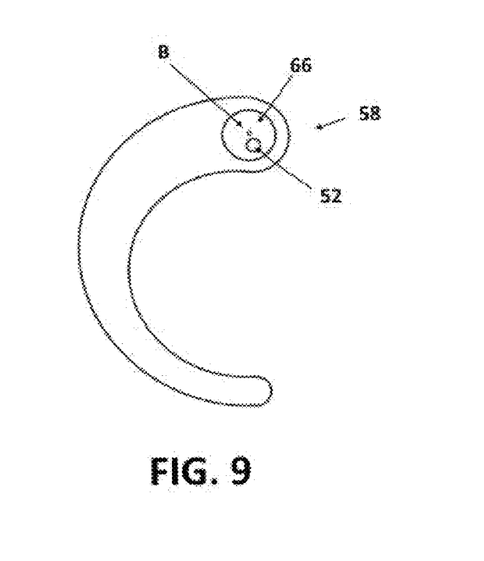
FIG. 9 depicts the lever arm of the blade attachment system of FIG. 8.

A second embodiment of a blade attachment system for an oscillating tool is depicted in FIGS. 8 and 9. The second embodiment is similar to the first embodiment except for the type of cam used and the type of movement of the clamping pin 52 that results. In the embodiment of FIGS. 8 and 9, the cam structure comprises an eccentric cam. The eccentric cam 66 is implemented by mounting the lever arm 58 to define the axis of rotation B with respect to the blade holder plate 38 and attaching the clamping pin 52 in an offset position 68 with respect to the rotation axis B of the lever arm 58. As the lever arm 58 is rotated, the position of the clamping pin 52 with respect to the edge of the blade changes. As a result, the lever arm 58 can be rotated to move the clamping pin 52 closer to and farther away from the edge of the blade.

Figure 10:
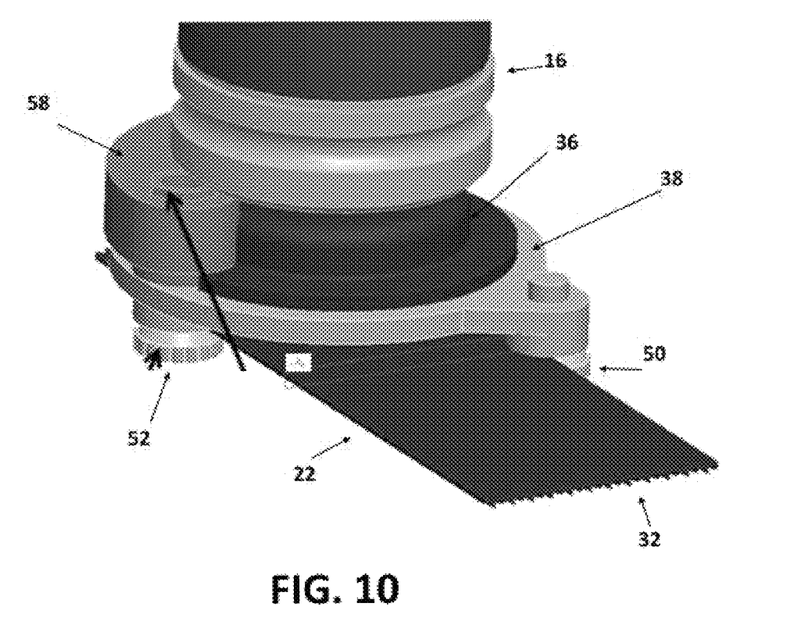
FIG. 10 depicts another embodiment of a blade attachment system for an oscillating tool.

FIG. 10 depicts a third embodiment of a blade attachment system for an oscillating tool. The third embodiment is similar to the first embodiment in that it enables axial movement of the clamping pin 52 with respect to the blade holder plate 38. In FIG. 10, however, the axial movement of the clamping pin 52 is implemented through a threaded interface between the clamping pin and the blade holder plate rather than using a face cam. More specifically, the stem portion of clamping pin 52 is provided with threads which are configured to mesh with the threads provided in the opening of the blade holder plate 38. The end of the clamping pin 52 is attached to the lever arm 58 so the lever arm 58 can be used to rotate the clamping pin 52 with respect to the opening and thereby move the tapered surface of the pin axially toward the lower surface of the blade holder plate. The adjustment of the clamping load by the clamping pin generated in this embodiment and similar embodiments, such as the embodiment of FIGS. 3-6, may be implemented via an adjustable connection between the clamping pin and the lever arm.

Figure 11:
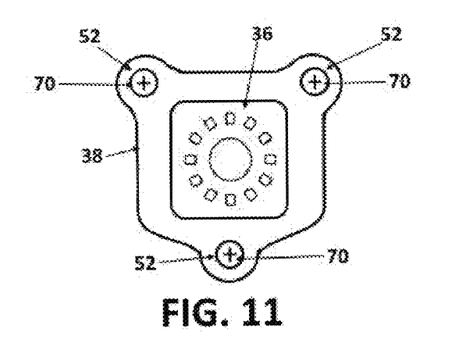
FIG. 11 depicts another embodiment of a blade attachment system for an oscillating power tool.
Figure 12:
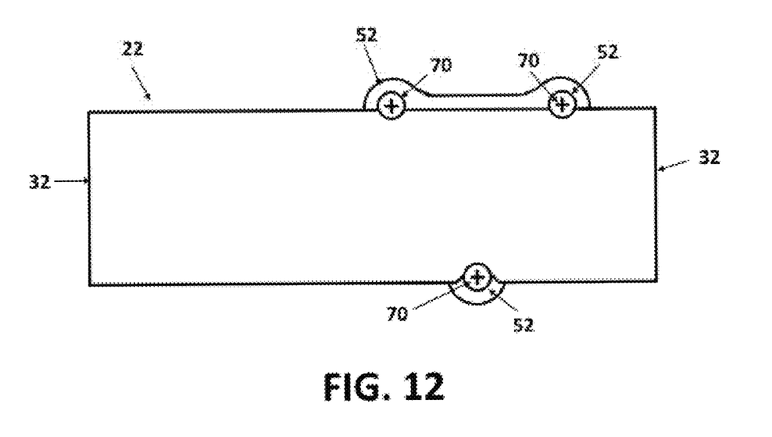
FIG. 12 depicts the blade attachment system of FIG. 11 with a blade secured thereto.
Figure 13:
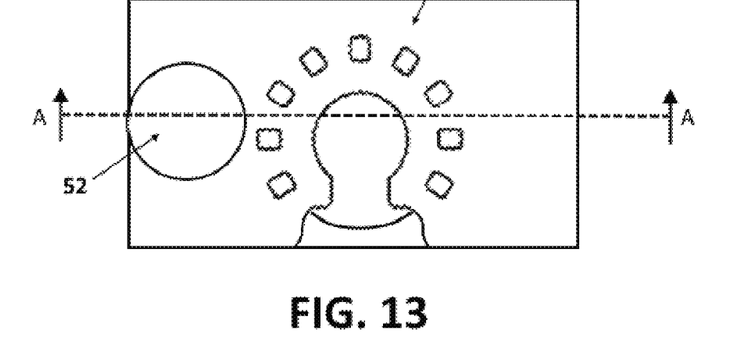
FIG. 13 depicts another embodiment of a blade attachment system for an oscillating power tool.

FIGS. 11 and 12 depict an embodiment of a blade attachment system that is similar to the embodiment of FIG. 10. In the embodiment of FIGS. 11 and 12, however, the lever arm 58 has been omitted. Rather than using a lever arm to rotate the clamping pin 52, the clamping pin 52 is provided with a drive structure on the head of the pin, such as a slot, cross, torx, hex, square-shaped drive, and the like. The clamping pin 52 may be rotated by using the equivalent size and type of driver (not shown) for the drive structure 70.

The clamping assemblies of the embodiments of FIGS. 3-12 each have a clamping pin with the axis of the pin oriented perpendicular to the plane of the blade and with the pin positioned to engage a lateral edge of the blade from below. In addition, in the embodiments of FIGS. 3-12, the surface used to generate the clamping force is provided on the head of the clamping pin. The embodiments of the clamping assemblies of FIGS. 13-21 depict embodiments of clamping assemblies having clamping pins that utilize a tapered surface on the tip of the pin to generate the clamping force and that have the clamping pin to access the lateral edges of the blade from the top and from the side.

Figure 14:
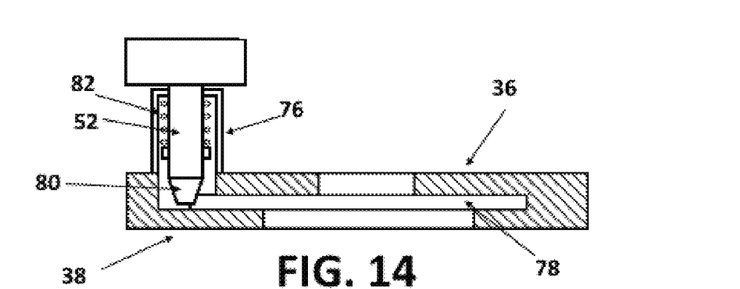
FIG. 14 is a cross-sectional view of the blade attachment system of FIG. 13 taken along line A-A.
Figure 15:
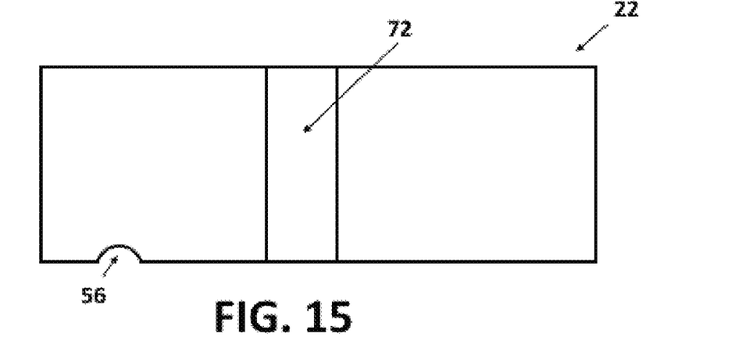
FIG. 15 is a top view of a blade for use with the blade attachment system of FIG. 13.
Figure 16:
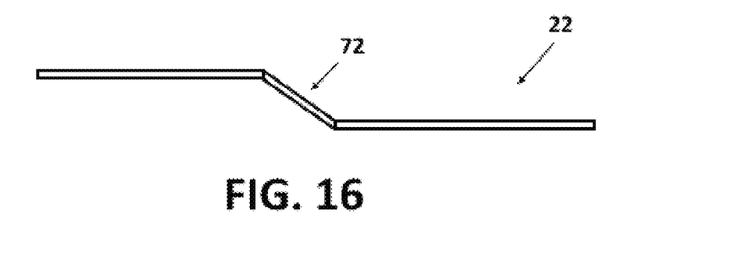
FIG. 16 is a side view of the blade of FIG. 15.

The embodiment of FIGS. 13-16 includes a clamping pin 52 that is positioned to engage the blade 22 from above. The pin 52 is supported by a wall structure 76, such as a cylinder, that extends above the tool mount adapter 36 and the blade holder plate 38. In this embodiment, the tool mount adapter 36 and the blade holder plate 38 define a slot 78 in which an end portion of the blade 22, such as the blade depicted in FIGS. 15 and 16, is received. As can be seen in FIG. 14, the clamping pin 52 has a tapered end portion 80 that is positioned to engage a lateral edge of the blade 22 when the blade is positioned in the slot 78. The pin 52 is biased downwardly by a spring element 82 to move the tapered end portion 80 into a clamping position at which it engages the lateral edge of the blade.

The tapered surface on the end portion 80 works in a manner similar to the tapered surfaces of the head portions of the clamping pins of the embodiments of FIGS. 3-12. In particular, as the tapered surface is pushed against the edge of the blade, the blade is moved downwardly toward the base of the slot and laterally toward the opposing walls of the slot to generate both a vertical clamping force and a lateral clamping force. As can be seen in FIG. 15, the blade 22 may include a cutout 56 in a position to be engaged by the end portion 80 of the clamping pin 52. The cutout 56 provides surfaces which can be engaged by the pin 52 to oppose movement of the blade in both a forward and rearward direction with respect to the tool mount adapter and the blade holder plate. FIGS. 15 and 16 also show an embodiment of a blade having an offset 72. The offset 72 is formed by an intermediate transition region that offsets the plane of the blade downwardly to provide clearance from the lower portion of the blade attachment system.

Figure 17:
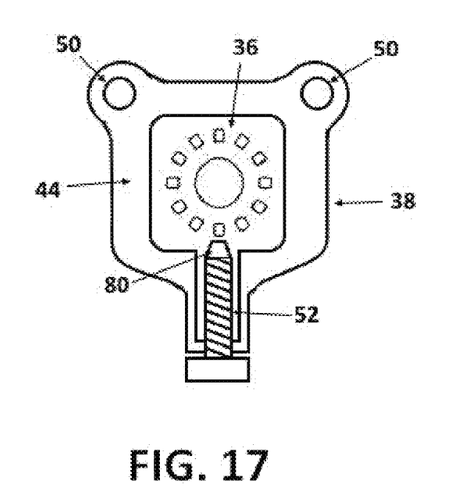
FIG. 17 depicts another embodiment of a blade attachment system for an oscillating power tool.
Figure 18:
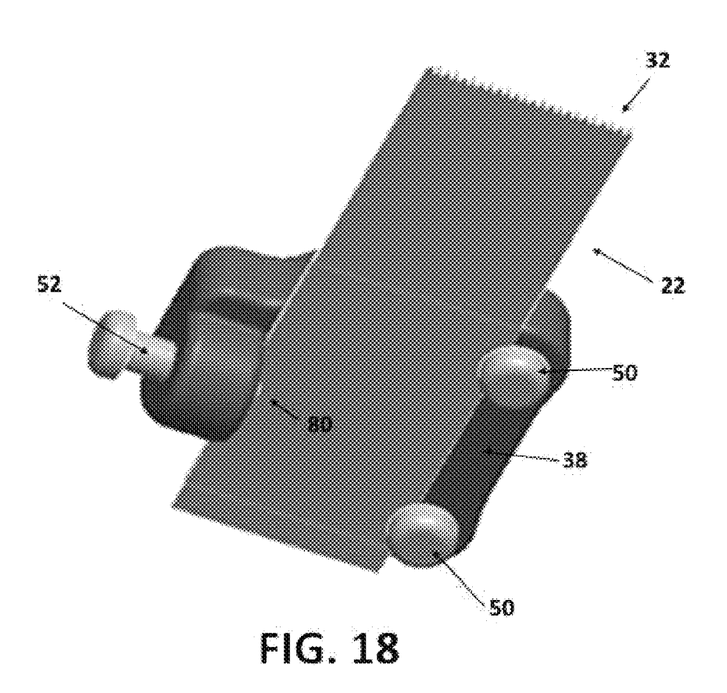
FIG. 18 depicts the blade attachment system of FIG. 17 with a blade secured thereto.

FIGS. 17 and 18 depict an embodiment of a clamping assembly in which the clamping pin 52 is positioned to engage a lateral edge of the blade from the side. As can be seen in FIG. 17, the blade holder plate 38 supports a clamping pin 52 with the axis of the pin oriented substantially parallel with the lower surface 44 of the blade holder plate 38. In this embodiment, the clamping pin 52 is configured to move axially toward and away from the blade edge via a threaded connection with an opening in the side of the blade holder 38.

The axial movement of the pin 52 brings the tapered end portion 80 of the pin 52 into engagement with the lateral edge of the blade. Fixed pins 50 are provided on the opposite side of the blade from the clamping pin 52. The tapered surface of the end portion 80 of the clamping pin 52 engages the lateral edge of the blade and pushes the blade vertically toward the lower surface of the blade holder plate and laterally to into engage with the tapered surfaces on the fixed clamping pings to generate both a vertical clamping force and a lateral clamping force. The pin may be positioned with the axis of the pin offset from the plane of the blade so that the tapered surface can engage the edge of the blade. The clamping pin can be rotated by hand via a knob on the end of the pin, or by using a driver, such as a screwdriver, in which case the head of the pin is provided with a suitable drive structure.

Figure 19:
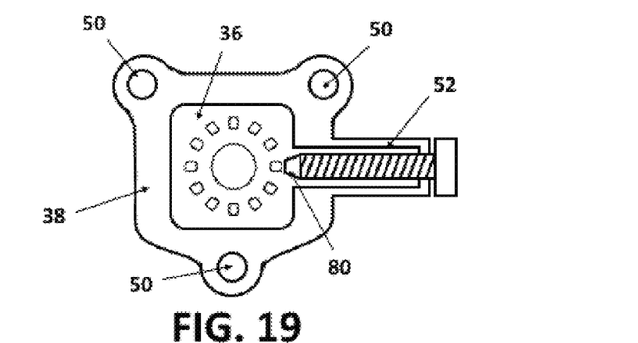
FIG. 19 depicts another embodiment of a blade attachment system for an oscillating power tool.

The embodiments of FIGS. 19-24 depict clamping assemblies that utilize a clamping screw primarily to move the blade with respect to the clamping structures which are embodied separately from the clamping screw. As can be seen in FIG. 19, the blade holder plate 38 supports a plurality of fixed clamping pins 50 positioned to engage the opposing lateral edges of a blade 22, such as the blade 22 depicted in FIG. 21. The clamping assembly has a configuration similar to a band clamp or a linear gear. In particular, the blade is provided with a linear gear track 84 that extends for a portion of the length of the blade 22.

The clamping assembly includes a clamping screw 52 that is configured to engage the linear gear track as a worm screw. As can be seen in FIG. 19, the clamping screw 52 is supported by the blade holder plate 38 with the pin axis oriented laterally so that it is substantially parallel to the blade 22. When the blade is placed against the support surface on the blade holder plate, the threads of the clamping screw 52 are configured to mesh with the tracks 84 on the blade 22.

To generate the vertical and lateral clamping loads for securing the blade to the blade holder, the blade is provided with a cutout 56, or notch, in at least one side of the blade 22. The inner edge of the cutout 56 defines a cam profile. When the blade is positioned on the support surface, the clamping surface on one of the pins 50 is positioned to engage the cam profile of the cutout 56. To secure the blade 22 to the blade holder, the worm screw 52 is rotated to draw the blade 22 rearwardly in direction R. The rearward movement of the blade 22 moves the cam profile of the cutout 56 into engagement with the tapered surface of the pin 50. This causes the blade 22 to be pushed laterally into engagement with the opposing clamping screws to generate the lateral clamping force. In addition, the tapered surface on the pins 50 push the blade 22 toward the support surface of the blade holder plate 38 to generate the vertical clamping force.

Figure 20:
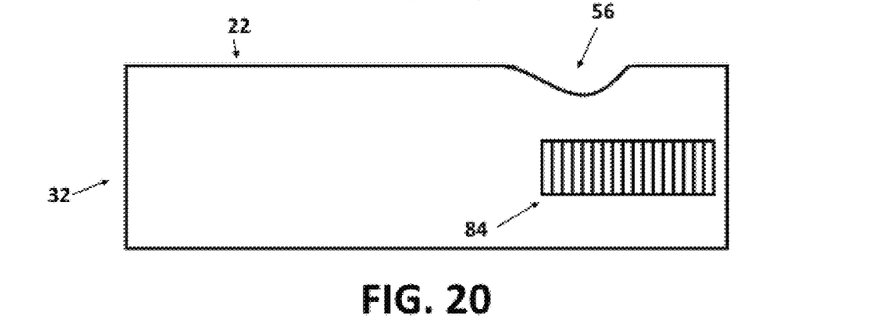
FIG. 20 depicts a blade for use with the blade attachment system of FIG. 19.
Figure 21:
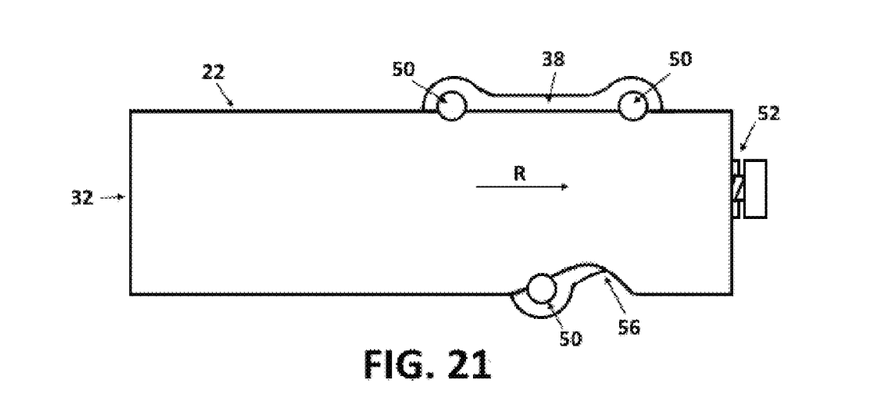
FIG. 21 depicts the blade of FIG. 20 secured to the blade attachment system of FIG. 19.
Figure 22:
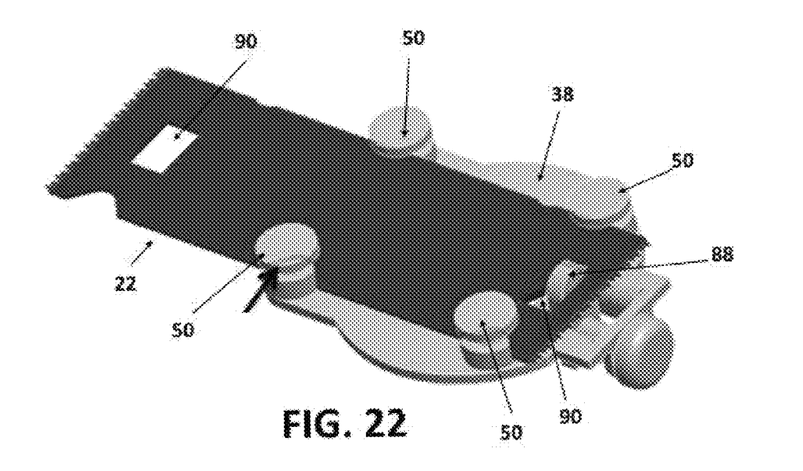
FIG. 22 depicts another embodiment of a blade attachment system for an oscillating power tool with a blade secured thereto.
Figures 23, 24:
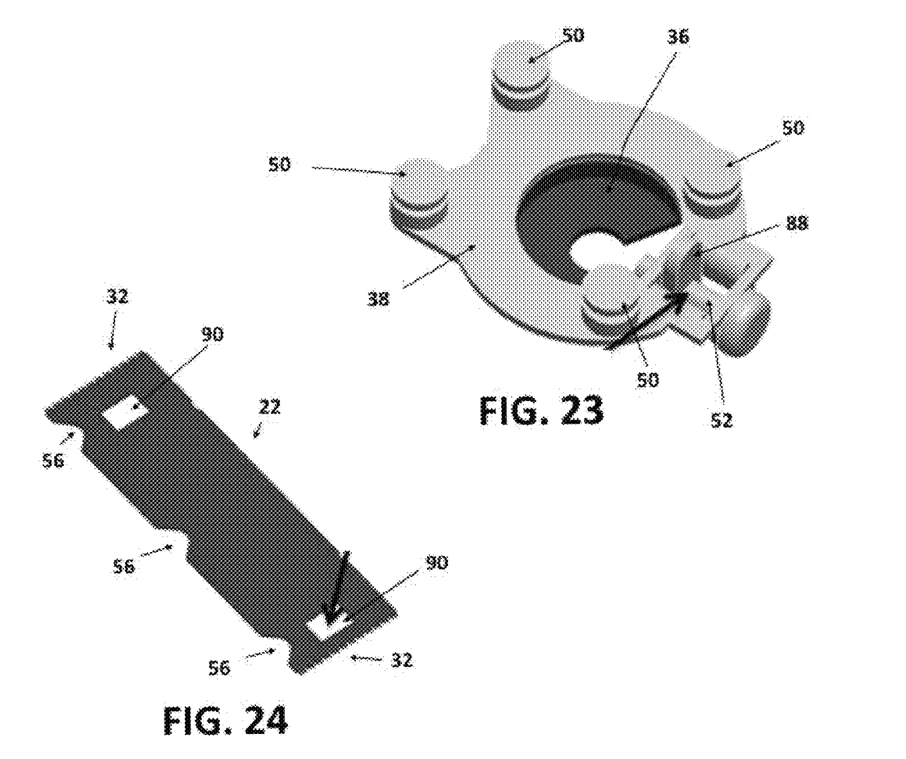
FIG. 23 depicts the blade attachment system of FIG. 22 with the blade removed.
FIG. 24 depicts an embodiment of a blade for use with the blade attachment system of FIG. 23.

The embodiment of FIGS. 22-24 has a configuration similar to the embodiment of FIGS. 19-21 except for the use of a different mechanism to move the blade rearwardly to generate the clamping forces. In FIGS. 22-24, the clamping screw is positioned similar to the clamping screw, or worm screw, of FIGS. 19-21. However, the clamping screw 52 in FIGS. 22-24 supports a clamping tab 88 that is moved by the clamping screw 52. The clamping tab 88 is in turn received in a tab cutout 90 defined in one or both end portions of the blade 22. As the screw 52 is rotated, the clamping tab 88 pulls the blade rearwardly to bring about the engagement between the clamping pins 50 and one or more cutouts 56 provided on the edges of the blade 22.

Figure 25:
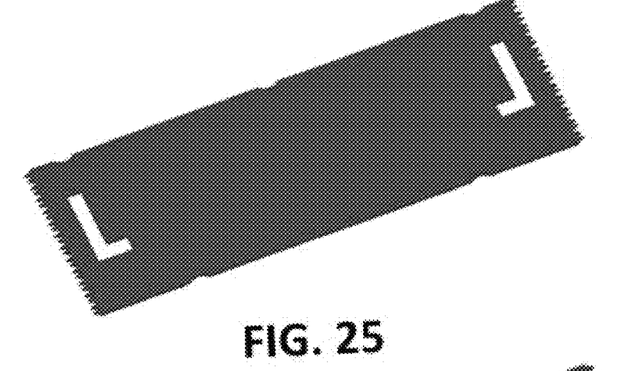
FIGS. 25-30 depict different embodiments of blades for use with the blade attachment system of FIG. 23 each having a different cutout configuration.
Figure 26:
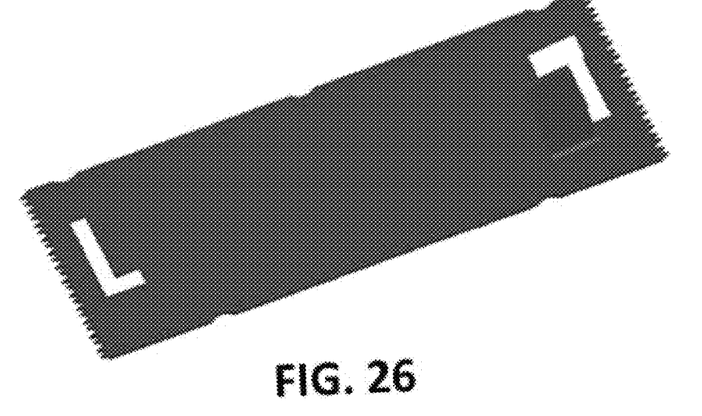
Figure 27:
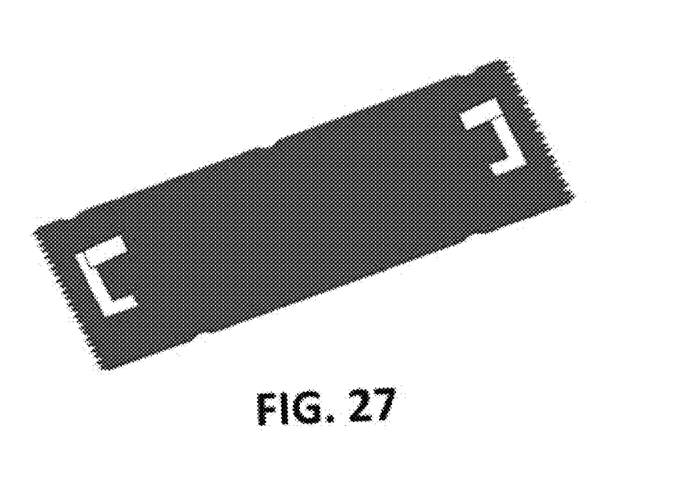
Figure 28:
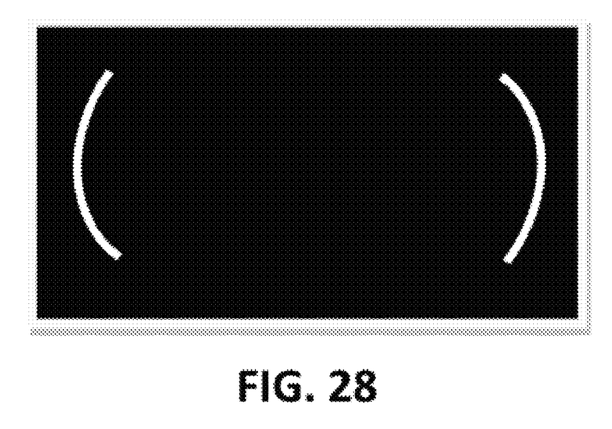
Figure 29:
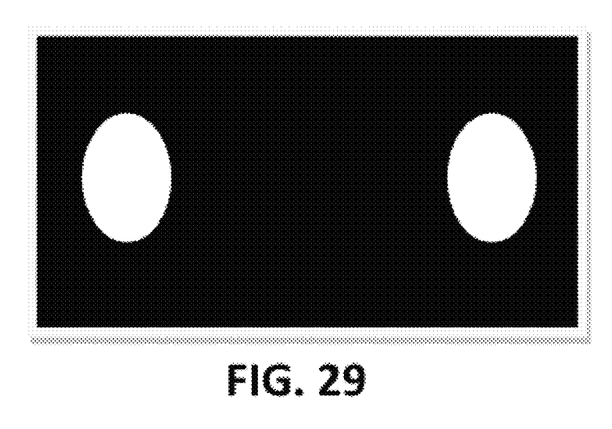
Figure 30:
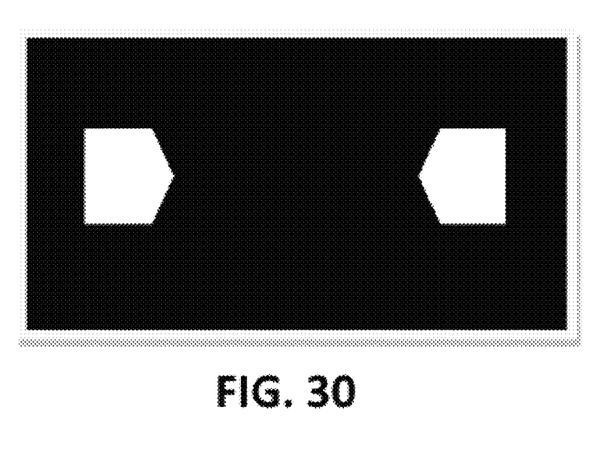

Clamping tabs and tab cutouts may have complementary keyed shapes which can help to maintain alignment of the blade as it is being pulled rearwardly. The keyed shapes can also be used to configure blades to work only with particular blade mounting systems. The cutouts may be provided in a variety of different shapes. FIGS. 25-20 depict blades with different cutout configurations for interacting with blade attachment systems having clamping tabs, such as depicted in FIGS. 22-24.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A handheld oscillating power tool comprising:
  a portable housing;
  a tool holder extending from the housing and configured to be oscillated about an oscillation axis, the toolholder including tool drive interface;
  a blade having a planar body with a leading edge, a trailing edge, and a pair of lateral edges, at least one of the leading edge and the trailing edge comprising a cutting edge; and
  blade attachment system including:
    a tool mount adapter having a drive attachment interface, the drive attachment interface being configured to be releasably secured to the tool drive interface of the tool holder such that the blade attachment system oscillates with the tool holder;
    a blade holder plate attached to the tool mount adapter; and
    a clamping assembly attached to the blade holder plate, the clamping assembly including:
      a plurality of fixed clamping pins that extend downwardly from a lower surface of the blade holder plate, the fixed clamping pins being positioned adjacent to at least one of the lateral edges of the blade when the blade is placed on the blade holder plate and including tapered surfaces configured to overlap the lateral edges of the blade, and
      at least one movable clamping pin that is movably mounted to the blade holder plate, the movable clamping pin being configured to move with respect to the blade to move the lateral edges of the blade into engagement with the tapered surfaces of the clamping pins,
  wherein the tapered surfaces are provided on head portions of the fixed clamping pins and the movable clamping pin,
  wherein the movable clamping pin is attached to a lever arm, the lever arm being configured to rotate the movable clamping pin between a clamped and an unclamped position,
  wherein the movable clamping pin is oriented with a pin axis of the pin substantially perpendicular to a plane of the blade, and
  wherein the lever arm includes a face cam that is configured to engage the blade holder plate to move the lever arm away from an upper surface of the blade holder plate, the movement of the lever arm away from the upper surface of the blade holder plate causing the movable clamping pin to move axially toward a lower surface of the blade holder plate.

2. A blade attachment system comprising:
  a tool mount adapter having a drive attachment interface, the drive attachment interface being configured to be releasably secured to a tool drive interface of a tool holder of an oscillating power tool such that the blade attachment system oscillates with the tool holder;
  a blade holder plate attached to the tool mount adapter; and
  a clamping assembly attached to the blade holder plate, the clamping assembly including:
    a plurality of fixed clamping pins that extend downwardly from a lower surface of the blade holder plate, the fixed clamping pins being positioned adjacent to at least one of the lateral edges of the blade when the blade is placed on the blade holder plate and including tapered surfaces configured to overlap the lateral edges of the blade, and
    at least one movable clamping pin that is movably mounted to the blade holder plate, the movable clamping pin being configured to move with respect to the blade to move the lateral edges of the blade into engagement with the tapered surfaces of the clamping pins,
  wherein the movable clamping pin is attached to a lever arm, the lever arm being configured to rotate the movable clamping pin between a clamped and an unclamped position,
  wherein the lever arm includes a face cam that is configured to engage the blade holder plate to move the lever arm away from an upper surface of the blade holder plate, the movement of the lever arm away from the upper surface of the blade holder plate causing the movable clamping pin to move axially toward a lower surface of the blade holder plate.

\* \* \* \* \*